Aug. 13, 1968  W. B. McCARDELL  3,396,570

NON-GENERATING TOOTH FORMING APPARATUS

Filed Aug. 11, 1965  7 Sheets-Sheet 1

INVENTOR
WILLARD B. McCARDELL
BY

*Bower & Patalidis*
ATTORNEYS

Aug. 13, 1968   W. B. McCARDELL   3,396,570
NON-GENERATING TOOTH FORMING APPARATUS
Filed Aug. 11, 1965   7 Sheets-Sheet 3

INVENTOR
WILLARD B. McCARDELL
BY
Bower & Patalidis
ATTORNEYS

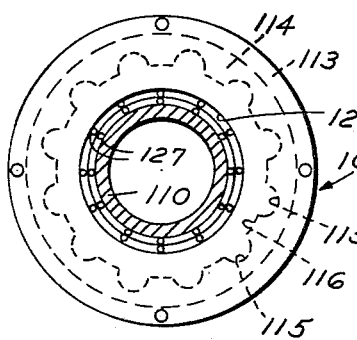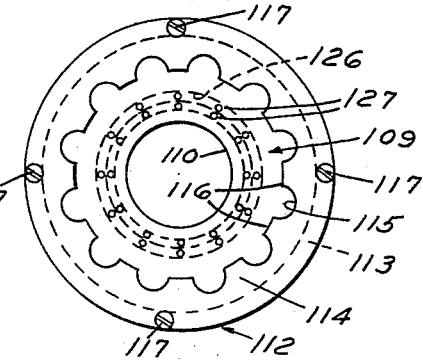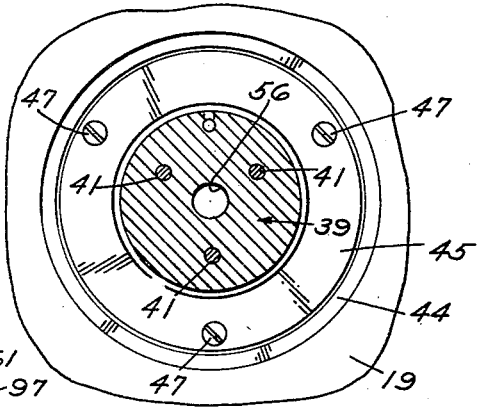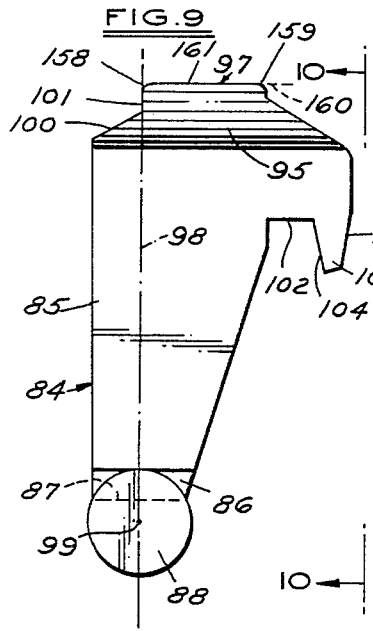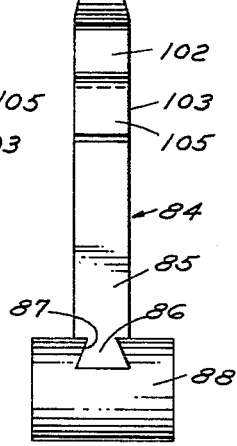

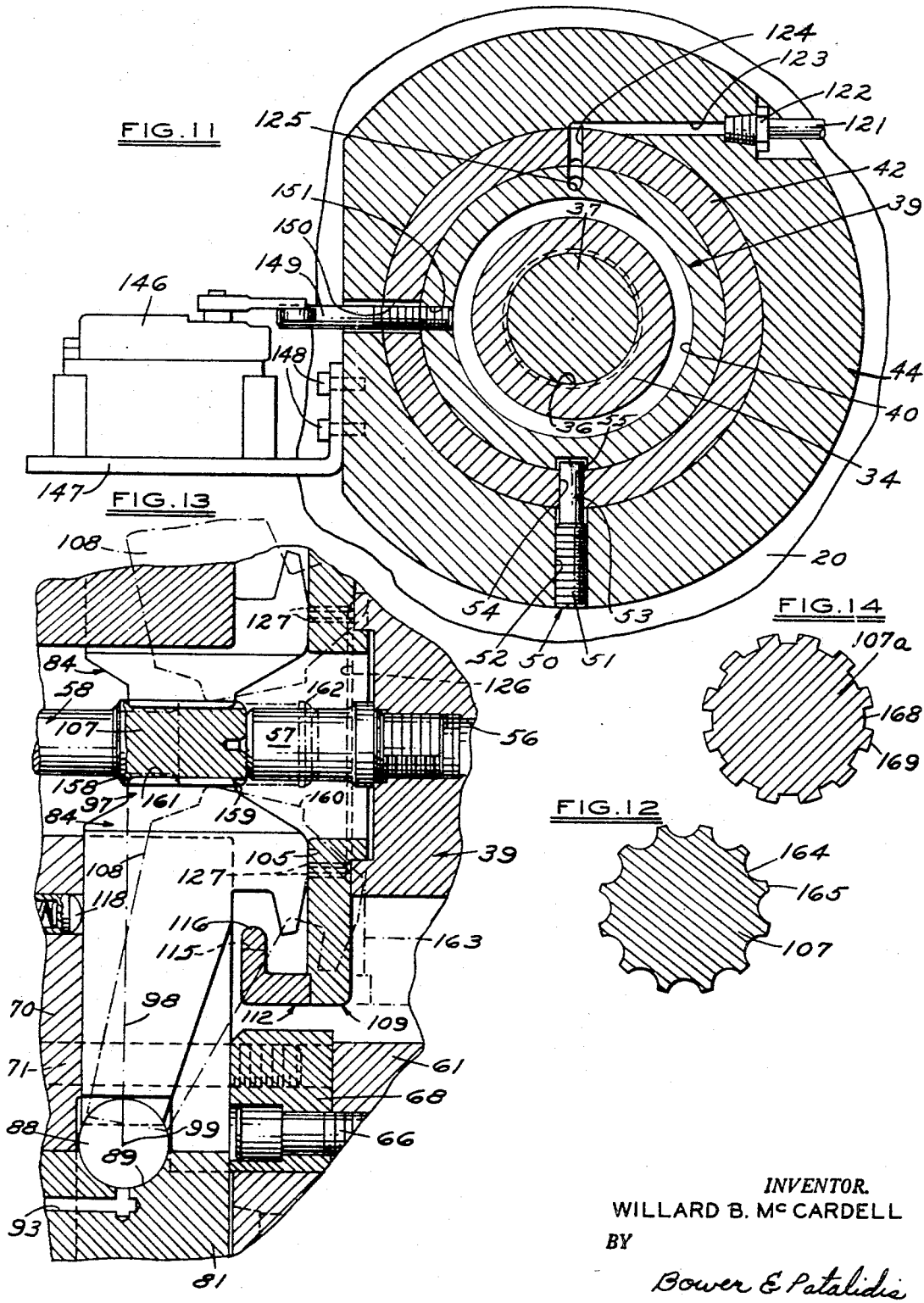

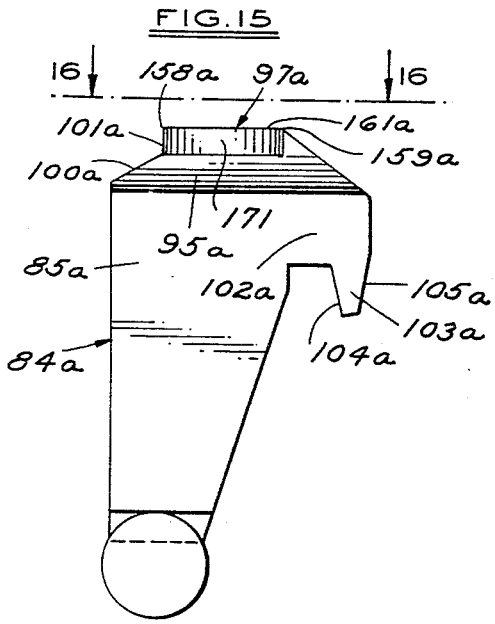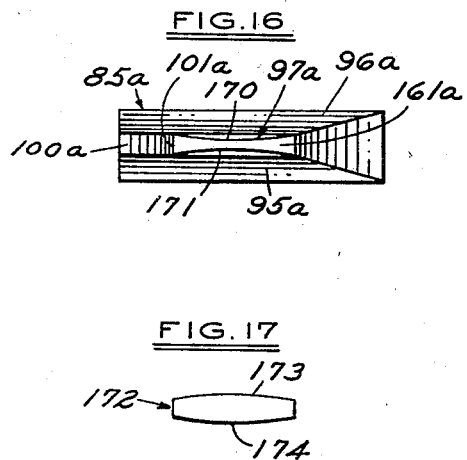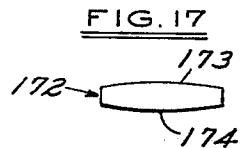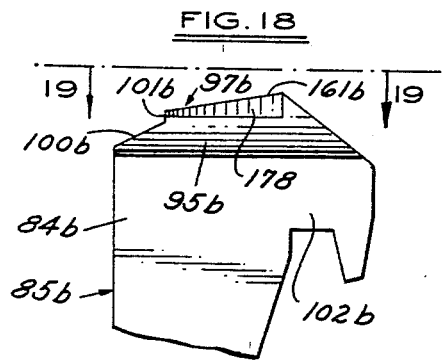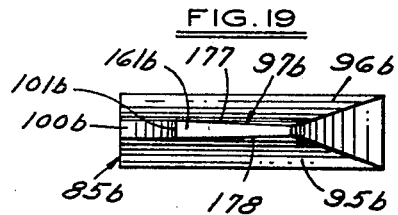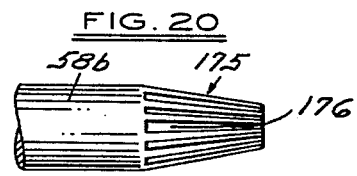

United States Patent Office 3,396,570
Patented Aug. 13, 1968

3,396,570
NON-GENERATING TOOTH FORMING
APPARATUS
Willard B. McCardell, Royal Oak, Mich., assignor to
Michigan Tool Company
Filed Aug. 11, 1965, Ser. No. 478,900
23 Claims. (Cl. 72—399)

ABSTRACT OF THE DISCLOSURE

A non-generating tooth forming apparatus adapted to form external teeth on a workpiece by pivoting simultaneously a plurality of radially disposed tooth forming blades into an external surface on the workpiece so as to displace the material of the workpiece between each tooth forming edge of the blade.

This invention relates generally to a novel and improved non-generating tooth forming apparatus and method for forming various types of teeth on an external cylindrical or conical surface of a workpiece.

It is an important object of the present invention to provide a novel and improved non-generating tooth forming apparatus which is adapted to form external teeth on a workpiece by pivoting simultaneously a plurality of radially disposed tools into displacing engagement with an external cylindrical or conical surface on the workpiece so as to displace the material of the workpiece between the tools in accordance with the shapes of the center edge portions of the front end of the tools engaging the workpiece.

It is another object of the present invention to provide a novel and improved non-generating tooth forming apparatus that employs a plurality of tooth forming blades which are each provided with a workpiece engaging end shaped so as to form the opposing faces or sides of two adjacent external spline or gear type teeth and the root therebetween when each blade is moved into engagement with an external cylindrical surface of a workpiece and pressed radially inward to displace the workpiece material.

It is a further object of the present invention to provide a novel and improved non-generating tooth forming apparatus that employs a plurality of tooth forming blades which are each provided with a shaped tooth-forming end including an elongated edge having a leading end and a trailing end, and said leading end of said edge is first engaged with a workpiece during a tooth forming operation and the remaining portion of said edge is then pivoted progressively and pressed radially into the workpiece.

It is still another object of the present invention to provide a novel and improved non-generating tooth forming apparatus which is simple and compact in construction, economical of manufacture, and efficient in operation.

It is still a further object of the present invention to provide a non-generating method for forming external spline or gear type teeth on a workpiece which includes the steps of, disposing a plurality of tooth forming blades having inner shaped ends in spaced apart, radial positions, with the outer ends pivotally mounted in a common plane and in a circular disposition concentric with a first axis; pivoting the inner shaped ends of the forming blades along said first axis to positions spaced apart axially from said plane; inserting a workpiece between the inner shaped ends of said forming blades and in alignment with said first axis; pivoting said forming blades simultaneously toward said plane to move progressively the inner shaped ends radially inward into the workpiece to displace the workpiece material and form a plurality of external spline or gear type teeth on the workpiece; and, retracting the inner shaped ends of said forming blades to said first mentioned positions spaced apart axially from said common plane.

It is still another object to provide a novel non-generating method for forming external teeth on a workpiece which includes the steps of, disposing a plurality of tooth forming blades having inner shaped ends in spaced apart, radial positions in a circular arrangement about an axis; inserting a workpiece between the inner shaped ends of said forming blades and in alignment with said axis; and, moving said forming blades simultaneously into engagement with said workpiece and radially inward to displace the workpiece material and form a plurality of external teeth on the workpiece.

It is another object of the present invention to provide a novel tooth forming apparatus including a support means, a plurality of tooth forming blades disposed in a circle in spaced apart radial positions, and power means for moving said blades radially inward into material displacing, tooth forming engagement with a workpiece disposed between the blades.

It is still another object of the present invention to provide a novel tooth forming apparatus for forming teeth on a workpiece, and which teeth may be of the spline type, the barrel or bevel gear type, or the like, and wherein the teeth may be formed on a workpiece of a suitable material that may be either cold or heated to a desired temperature before forming the teeth.

Other objects, features and advantages of this invention will be apparent from the following detailed description, appended claims, and the accompanying drawings.

In the drawings:

FIG. 6 is a fragmentary, elevational section view of the structure illustrated in FIG. 3, taken along the line 6—6 thereof, looking in the direction of the arrows, and showing a rear view of the pressure plate;

FIG. 7 is a fragmentary, elevational section view of the structure illustrated in FIG. 3, taken along the line 7—7 thereof, with parts removed, and showing the front side of the retractor ring and pressure plate;

FIG. 8 is a fragmentary, elevational section view of the structure illustrated in FIG. 3, taken along the line 8—8 thereof, and looking in the direction of the arrows;

FIG. 9 is a side elevational view of one type of non-generating tooth forming tool adapted to be used in the apparatus of the present invention;

FIG. 10 is a right side elevational view of the tool illustrated in FIG. 9, taken along the line 10—10 thereof, and looking in the direction of the arrows;

FIG. 11 is a fragmentary, enlarged elevational section view of the structure illustrated in FIG. 3, taken along the line 11—11, and looking in the direction of the arrows;

FIG. 12 is a fragmentary, elevational section view of the workpiece illustrated in FIG. 3, taken along the line 12—12 thereof, with the tooth forming blades removed, and showing the cross sectional shape of one type of external tooth adapted to be formed by the apparatus of the present invention;

FIG. 13 is a fragmentary, elevational section view of the forming head structure of the invention, showing an enlarged portion of the left end of the structure of FIG. 3;

FIG. 14 is an elevational section view, similar to FIG. 12, and showing a cross sectional shape of another type of external type tooth adapted to be formed by the apparatus of the present invention;

FIG. 15 is a side elevational view of a second type of non-generating tooth forming tool adapted to be used in the apparatus of the present invention;

FIG. 16 is a top end view of the tool illustrated in FIG. 15, taken along the line 16—16 thereof, and looking in the direction of the arrows;

FIG. 17 is a plan view of a barrel type tooth formed by the forming blade illustrated in FIGS. 15 and 16;

FIG. 18 is a fragmentary, side elevational view of a third type of forming tool adapted to be used in the apparatus of the present invention;

FIG. 19 is a top end view of the forming blade illustrated in FIG. 18, taken along the line 19—19 thereof, and looking in the direction of the arrows; and, FIG. 20 is a fragmentary view of a workpiece on which has been formed a plurality of bevel type gear teeth by a plurality of forming blades of the type illustrated in FIGS. 18 and 19.

Figure 1:
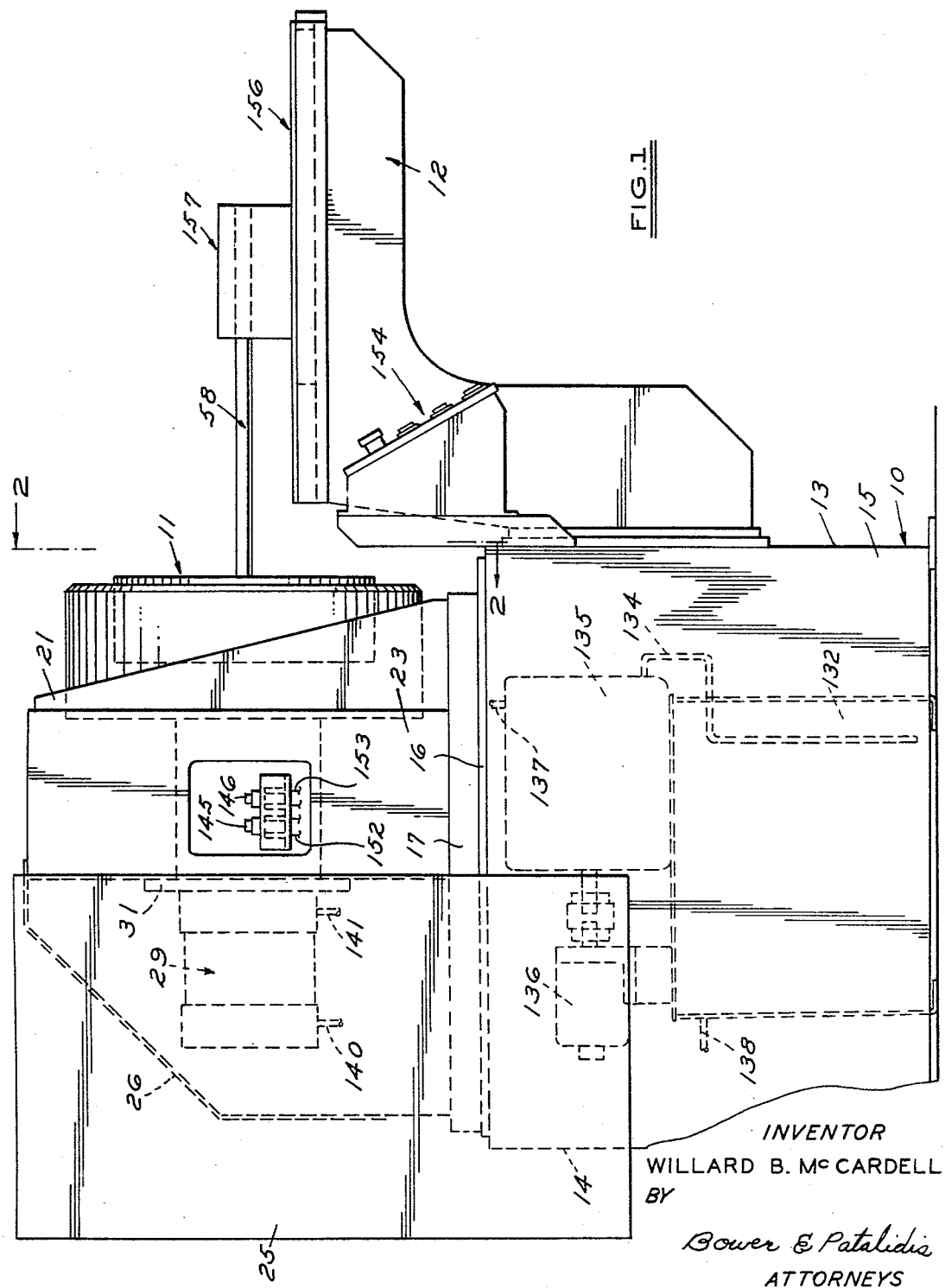
FIG. 1 is a side elevational view of a non-generating tooth forming apparatus made in accordance with the principles of the present invention.

Referring now to the drawings, and in particular to FIG. 1, the numeral 10 generally indicates a housing in which is operatively mounted an illustrative embodiment of the non-generating tooth forming apparatus of the present invention, generally indicated by the numeral 11. The numeral 12 generally indicates an outboard workpiece support member for supporting a workpiece during a tooth forming operation by the tooth forming apparatus 11, as more fully explained hereinafter. The housing 10 includes a lower box shaped portion comprising the front wall 13, the rear wall 14, a pair of spaced apart side walls 15, and a top wall 16.

Figure 2:
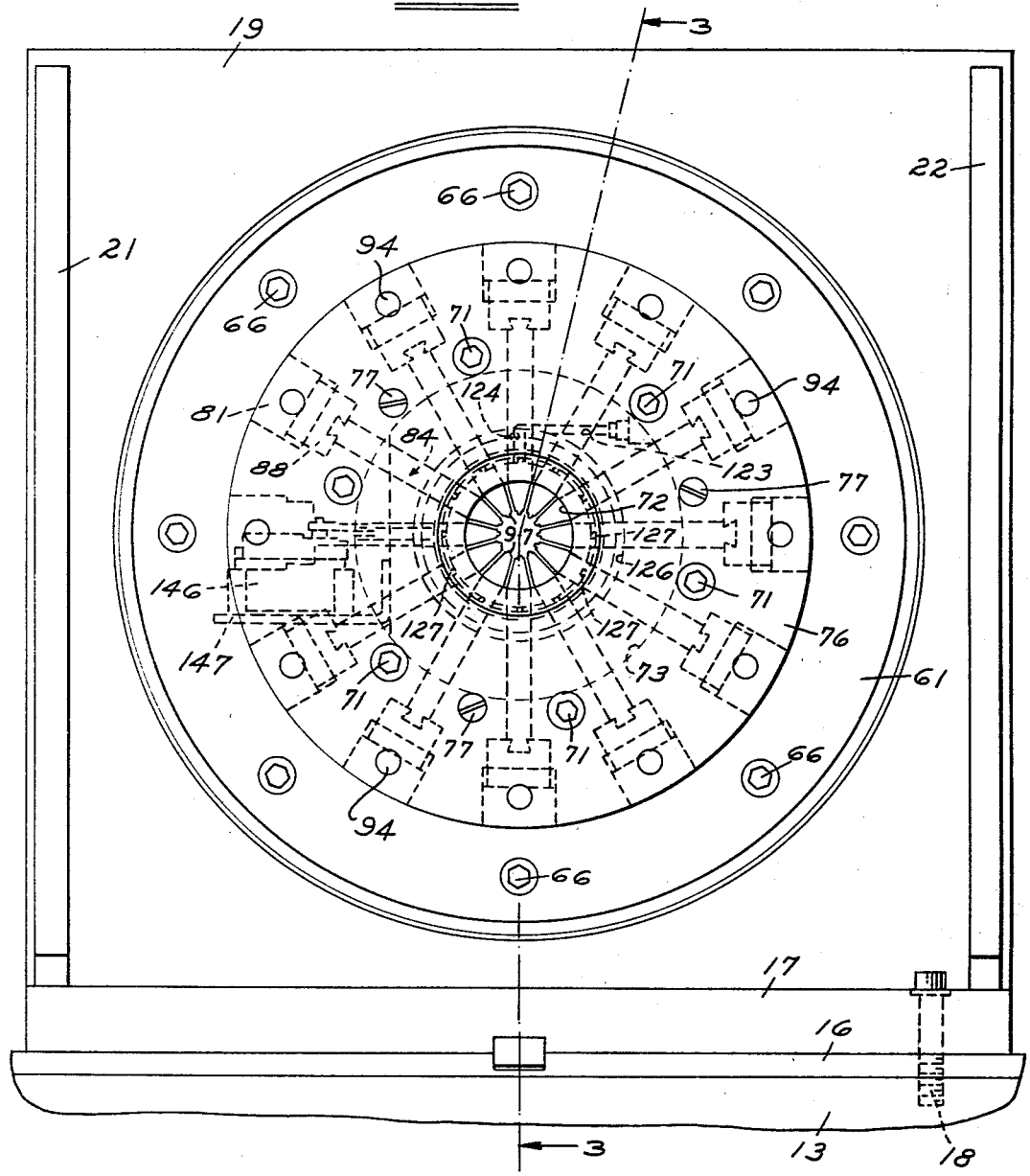
FIG. 2 is a fragmentary, enlarged elevational view of the structure illustrated in FIG. 1, taken along the line 2—2 thereof, and looking in the direction of the arrows, and with the workpiece removed.
Figure 3:
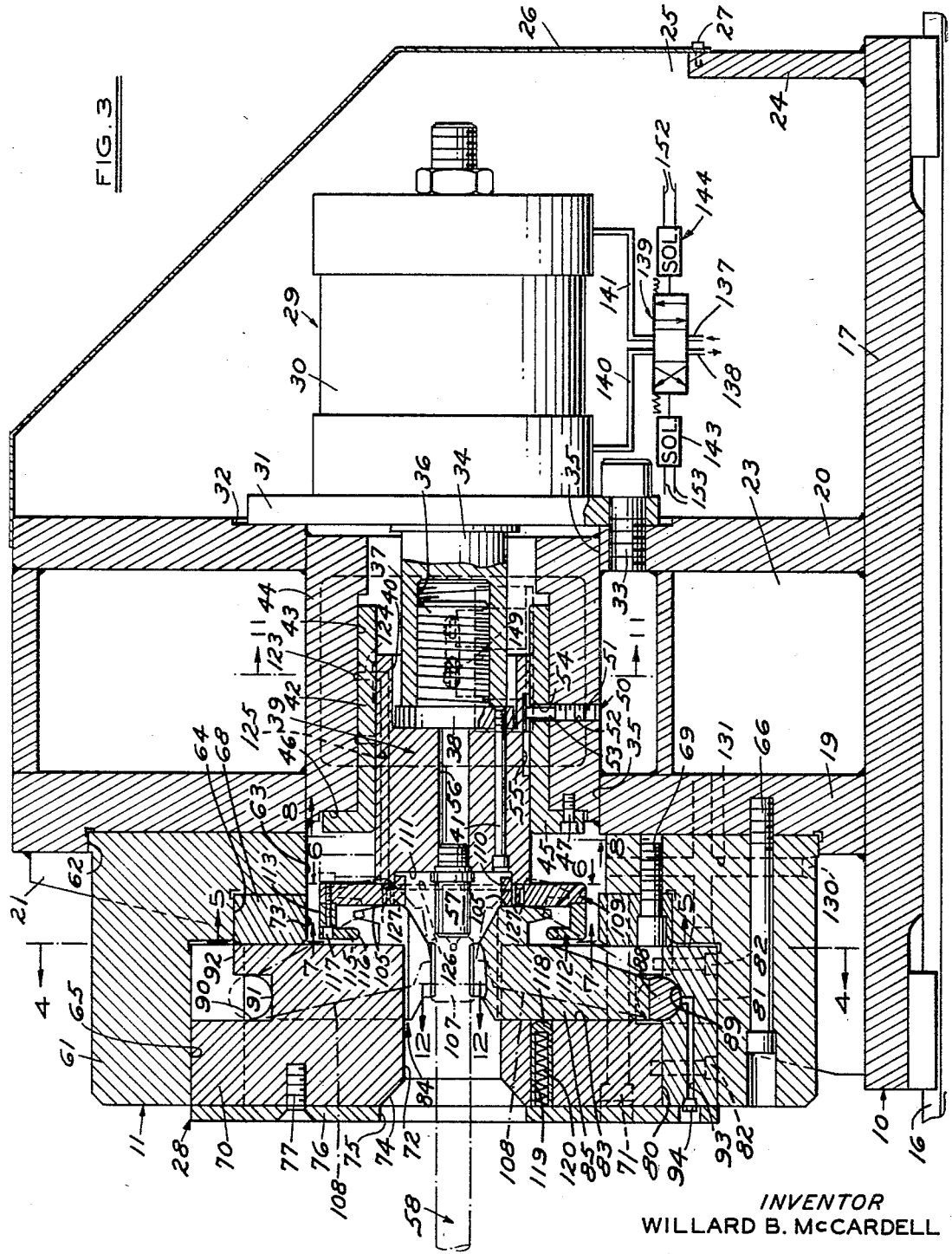
FIG. 3 is an elevational section view of the structure illustrated in FIG. 2, taken along the line 3—3 thereof, and looking in the direction of the arrows.

The non-generating apparatus 11 is operatively mounted in the upper portion of the housing 10 which comprises the base plate 17 that is fixed to the lower housing portion top wall 16 by any suitable means, as by screws 18, as shown in FIG. 2. As shown in FIG. 3, the housing upper portion further includes a pair of spaced apart, transversely disposed vertical mounting plates 19 and 20 which are secured to the base plate 17 by any suitable means, as by welding. As shown in FIG. 2, a pair of spaced apart side wall plates 21 and 22 is secured to the outer face of the front transverse mounting plate 19, along the sides thereof, and to the base plate 17 by any suitable means, as by welding.

As illustrated in FIGS. 1 and 3, the housing upper portion further includes a pair of vertical side plates 23 which are mounted on the sides of the housing and secured to the outer sides of the transverse mounting plates 19 and 20. As shown in FIG. 3, the upper portion of the housing 10 further includes a third transversely disposed vertical frame plate 24 which is secured to the base plate 17 at a position spaced rearwardly from the transverse mounting plate 20. The transverse plate 24 terminates at a short distance above the base plate 17. The space between the transverse plates 20 and 24 is enclosed along the sides by spaced apart side plates 25. The rear end of the housing upper portion is enclosed by a removable cover 26 which is detachably secured to the rear plate 24 by any suitable means, as by screws 27.

As best seen in FIG. 3, the non-generating apparatus of the present invention includes a forming head generally indicated by the numeral 28 which is adapted to be operated by a fluid cylinder generally indicated by the numeral 29. The fluid cylinder 29 may be of any suitable type and may be operated by a suitable fluid such as air under pressure or hydraulic oil. In the illustrative embodiment, the fluid cylinder 29 is illustrated as being a hydraulic cylinder which is provided with hydraulic oil under pressure from a pump and reservoir arrangement illustrated in FIG. 1.

As shown in FIG. 3, the fluid cylinder 29 includes the usual casing 30, on the front end of which is fixed a mounting flange 31. The flange 31 is seated in a recess 32 formed on the rear side of the rear transverse mounting plate 20 and is secured to the plate 20 by any suitable means, as by a plurality of screws 33. The cylinder rod 34 of the fluid cylinder 29 extends forwardly through the flange 31 and through the bore 35 formed through the transverse mounting plate 20. The cylinder rod 34 is provided on its outer end with an inwardly extending, axially disposed threaded recess 36 in which is mounted the threaded shaft 37 that is fixed to a cylinder adaptor plate 38.

As shown in FIG. 3 an axially disposed cylindrical sleeve 39 is positioned in line with the cylinder rod 34 and is provided on the rear end thereof with an inwardly extended axial bore 40. The cylinder adaptor plate 38 is mounted in the sleeve bore 40 and secured to the cylindrical sleeve 39 by any suitable means, as by a plurality of screws 41. The sleeve 39 is slidably mounted in a cylindrical bearing or bushing 42 which is seated in the bore 43 of a tubular support member 44. The bushing 42 is provided with an integral flange 45 on the front end. The flange 45 is seated in a recess 46 formed in the front face of the front end of the support member 44. The flange 45 is detachably secured to the support member 44 by any suitable means, as by a plurality of screws 47. The support member 44 is mounted in the bores 35 which are formed through the mounting plates 19 and 20. The support member 44 is secured in position by any suitable means as by dog point set screws, or by welding.

As shown in FIGS. 3 and 11, the sleeve 39 is permitted to reciprocate in the bushing 42, but is prevented from rotating by the dowel pin generally indicated by the numeral 50. The dowel pin 50 has a threaded outer end 51 which is threadably mounted in the threaded hole 52 formed radially through the support member 44. The inner end 53 of the dowel pin 50 is reduced and has a plain cylindrical surface which extends through the bore 54 in the bushing 42 and into sliding engagement in the longitudinal dowel pin slot 55 formed in the outer periphery of the sleeve 39. As shown in FIG. 3 the sleeve 39 is provided with an axial bore 56 in which is threadably mounted a center 57 for operative engagement with one end of a workpiece 58 on which is to be performed a tooth forming operation.

As shown in FIG. 3, the tooth forming apparatus 28 includes an annular casing 61 which is seated in a recess 62 formed in the front side of the mounting plate 19. The casing 61 is provided with an axial stepped bore having an inner portion 63 which is formed to a diameter equal to the bore 35 formed through the mounting plates 19 and 20. The casing 61 is provided with an intermediate stepped bore portion 64 which is formed to a diameter larger than the inner bore portion 63. The outer portion 65 of the stepped bore in the casing 61 is made to a diameter larger than the diameter of the bore portion 64. The casing 61 is secured to the mounting plate 19 by any suitable means, as by a plurality of screws 66. The tooth forming apparatus further includes a retainer ring 68 which is seated in the casing stepped bore portion 64 and secured in place by any suitable means, as by screws 69.

Figure 4:
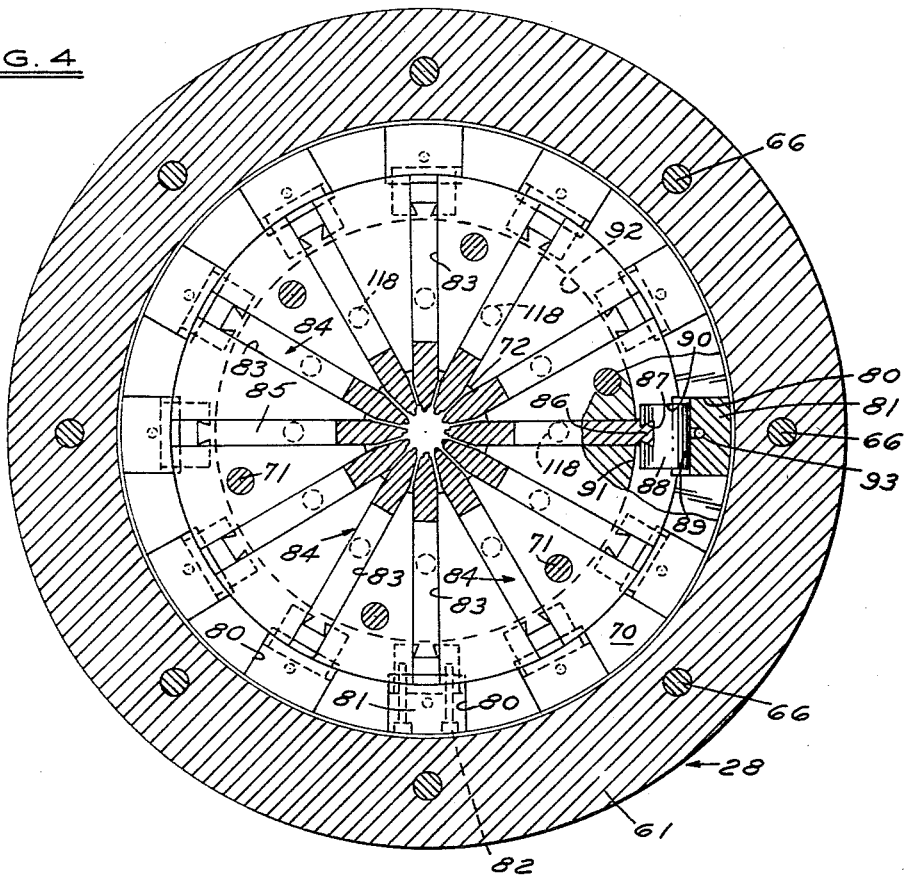
FIG. 4 is a fragmentary, elevational section view of the structure illustrated in FIG. 3, taken along the line 4—4 thereof, looking in the direction of the arrows, and with the workpiece removed.
Figure 5:
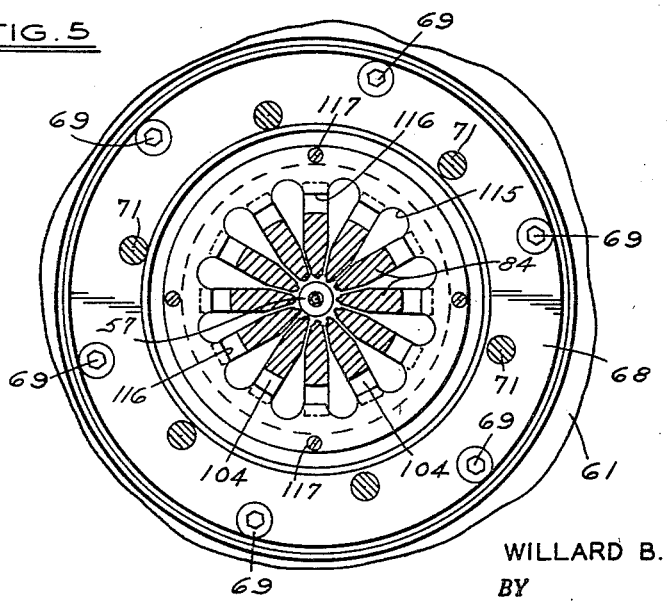
FIG. 5 is a fragmentary, elevational section view of the structure illustrated in FIG. 3, taken along the line 5—5 thereof, looking in the direction of the arrows, and with the workpiece removed.

As shown in FIGS. 3 and 4, the forming head 28 includes a round body 70 which is seated in the casing stepped bore outer portion 65 and is secured to the retainer ring 68 by any suitable means, as by a plurality of screws 71. The body 70 is provided with an axial bore 72 which communicates with the interior 73 of the retainer ring 68 and the casing bore portion 63. The outer end of the bore 72 is enlarged and diverges outwardly as indicated by the numeral 74. The bore outer end portion 74 communicates with the bore 75 formed through the face plate 76 which is secured to the body 70 by any suitable means, as by a plurality of screws 77.

As best seen in FIG. 4, the forming head body 70 is provided around the periphery thereof with a plurality of evenly spaced apart, axially and radially extended slots 80 in each of which is mounted a shoe or bearing 81 made from any suitable material, as for example bronze. Each of the shoes 81 is secured to the block 70 by any suitable means, as by the screws 82. Each of the slots 80 communicates at the inner end thereof with a radially disposed slot 83 in which is pivotally seated a tooth forming tool or blade 84. It will be understood that the number of tools 84, and slots 80 and 83, in each particular case will be determined by the number of teeth to be formed on the workpiece 58.

As shown in FIGS. 3 and 4, the radial slots 83 extend inwardly and communicate at their inner ends with the axial bore 72 formed through the block 70. The first type of illustrative forming tools or blades 84 are formed identically and one of these blades is shown in detail in FIGS. 9 and 10. Each of the forming blades is provided with an elongated body portion 85 which may be of any desired cross sectional shape, as for example that of a blade wherein the thickness is of a smaller dimension than the height. The blade 84 is provided on the rear end of the body portion 85 with a dovetail connection member 86 which is adapted to be secured in a dovetail slot 87 formed in a pivot pin 88 by any suitable means, as by soldering.

As best seen in FIG. 4, each of the pivot pins 88 is journaled in a concave mating seat 89 formed in the adjacent bearing or shoe 81. The pivot pin 88 extends inwardly into the annular groove 90 which communicates with the shoe slots 80 and the radial slots 83. The inner end 91 of the groove 90 forms a shoulder against which abuts the pivot pins 88. The block 70 is provided on the rear end thereof with a reduced periphery 92. As shown in FIG. 3, each of the pivot pin seats 89 is adapted to be lubricated through the grease passage 93 which is formed through the block 70. The passage 93 is provided at the outer end thereof with a conventional grease fitting 94.

As best seen in FIGS. 9 and 10, the front end of the body portion 85 of each blade 84 is provided with a triangularly shaped nose, when viewed from the top and bottom sides thereof. The blade nose is provided with flat converging sides 95 and 96 which terminate in the shaped front end portion 97. The shaped front end portion 97 is made to the exact shape of the space to be formed between two adjacently disposed teeth on the workpiece 58. The shaped front end 97 forms the tooth root and two sides of two adjacent teeth. The shaped front end portion 97 is disposed along an axis perpendicular to the longitudinal axis 98 of the blade body portion 85. The axis 98 of the body portion 85 is disposed perpendicular to the longitudinal axis 99 of the pivot pin 88. As shown in FIG. 9, the front or leading end of the tool is relieved as indicated by the numeral 100 and forms the shoulder 101 with the shaped front end portion 97. The shoulder 101 is disposed on a plane aligned with the longitudinal axis 98 of the body portion 85 and the axis 99 of the pivot pin 38.

As shown in FIGS. 3, 9 and 10, the forming blade 84 is provided with means for pivoting the blade body 85 about the pivot pin 88 comprising the combination pusher head and retraction means that includes the outwardly extended arm 102 which is formed integrally with the body portion 85 of the forming tool at a point adjacent the shaped front end 97 and immediately rearward thereof. The arm 102 extends laterally or perpendicularly outward from the tool body portion 85 in a direction parallel to the shaped front end 97 and is integral at the outer end thereof with the lip 103. The lip 103 extends longitudinally rearward toward the pivot pin 88 and is disposed in a position spaced apart from the body portion 85. The inner surface 104 of the lip 103 is adapted to be engaged by a retractor means for retracting the shaped front end 97 from a finished workpiece, as described in detail hereinafter. The outer surface 105 is engaged by a pressure plate 109.

The shaped front end 97 of the forming tool blade 84 is made in accordance with the particular type tooth to be formed and the particular workpiece to be operated on. The forming blade 84 is made and used in sets. The shaped front end 97 of the illustrative blade 84 is adapted to form a straight tooth root. It will be understood that other types of root shapes may be formed, as for example, tapered root shapes for bevel gear teeth, curved root shapes for barrel type gear teeth, and so on. The forming blade 84 of the present invention was disclosed and separately claimed in my copending U.S. Patent application, S.N. 478,910, filed Aug. 11, 1965, and entitled "Non-Generating Tooth Forming Tool," now abandoned. The invention of copending application Ser. No. 478,910 is included in the present application, and application Ser. No. 478,910 is now abandoned.

As shown in FIG. 3, the forming apparatus of the present invention is adapted to form external spline or gear type teeth on a cylindrical surface, as indicated by the numeral 107. FIGS. 12 and 14 show cross sections of workpieces after they have been operated on by the tooth forming apparatus of the present invention.

As shown in FIG. 3, each of the forming blades 84 is adapted to be moved between a retracted position 108, shown in dotted lines, and an advanced position, shown in solid lines. The solid line position indicates the position which each forming blade 84 assumes at the end of a forming stroke. The forming blades 84 are adapted to be pivoted between said dotted line positions and solid line positions as a set by the following described structure.

As shown in FIGS. 3 and 6, a pressure plate 109 is mounted on the front end of the sleeve 39. The pressure plate 109 is formed with a rearwardly extended axial flange 110 which is adapted to be seated in an axial recess 111 formed on the front end of the sleeve 39. The pressure plate 109 is provided with an axial bore which extends through the flange 110 to permit the center member 57 to pass therethrough. The pressure plate 109 may be secured to the sleeve 39 by any suitable means, as by suitable machine screws. The front end of the pressure plate 109 is adapted to bear against the outer surface 105 formed on each of the lips 103 for swinging or pivoting the blades 84 from their retracted positions 108 through a forming stroke. The blades 84 are adapted to be retracted simultaneously to their dotted line positions 108 by a retractor ring 112 which is secured to the front side of the pressure plate 109 and which is adapted to move forwardly and backwardly with the plate 109.

As best seen in FIGS. 3, 6 and 7, the retractor ring 112 is provided with the axially extended portion 113 which extends forwardly over the forming blade retractor lips 103. Integrally formed on the forward end of the axial portion 113 is the radial, inwardly extended flange 114 which is provided with a plurality of spaced apart grooves 115 to permit passage therethrough of the lips 103 when the forming head 28 is mounted initially in the casing 11. The forming head 28 is then rotated slightly so as to bring the tangs or retractor lugs 116 formed between the grooves 115 into axial alignment with the blade lips 103. The reactor ring 112 is adapted to be connected to the pusher or pressure plate 109 by any suitable means, as by the screws 117. It will be seen that when the pressure plate 109 is retracted or moved to the right, as viewed in FIG. 3, the retractor tangs 116 will engage the inner lip surfaces 104 and swing the forming blades 84 to the dotted line positions 108.

As shown in FIG. 3, each of the forming blades 84 is adapted to be engaged by a spring loaded piston 118 which functions to hold each blade against the pusher plate 109. Each piston 118 is slidably mounted in an axially disposed hole 119 which communicates with an adjacent forming blade slot 83. Each of the pistons 118 is normally biased inwardly toward the adjacent blade slot 83 by a spring 120.

The contact area between the forming blades 84 and the front side of the pressure plate 109 is lubricated by the following described structure. As shown in FIG. 11, a lubricating fluid supply line 121 is connected by the fitting 122 to the outer end of a fluid passage 123 formed in the support member 44. The inner end of the passage 123 communicates with the radial inwardly extended passage 124 which passes through the bushing 42 and communicates with the longitudinally extended passage 125 in the sleeve 39. The passage 125 conducts the pressurized lubricant to an annular passage 126 which is formed on the rear side of the pressure plate 109, as shown in FIGS. 3 and 6. A double row of axial passages 127 are formed through the pressure plate 109, at each location where the pressure plate engages a forming blade, to conduct pressurized lubricating fluid from the annular passage 126 into the contact area between the face of the pressure plate 109 and the pressure sides 105 of the blade lips 103.

As shown in FIG. 3 the casing 61 is provided with an air port 130 which is connected to a passage 131 that extends radially inward and communicates with the interior of the casing 61. A suitable source of air under pressure may be connected to the port 130 for blowing dirt out of the inside of the forming head 28.

The fluid cylinder 29 is adapted to move the pressure plate 109 forwardly and backwardly and is operated by hydraulic fluid under pressure supplied from a suitable source, such as the reservoir 132 shown in FIG. 1. A suitable hydraulic fluid pump 135 is mounted on the reservoir 132 and is connected thereto by a supply conduit as 134. The pump 135 is operatively connected to an electric drive motor 136. Fluid under pressure is supplied by the pump 135 to the outlet conduit 137 which conducts the fluid to a suitable flow control valve, generally indicated by 139 in FIG. 3. The valve 139 is also connected to the fluid reservoir 132 by the exhaust conduit 138. The valve 139 may be any suitable four-way reversing valve which is adapted to supply fluid to the opposite ends of the fluid cylinder 29 through the conduits 140 and 141. As illustrated in FIG. 3, the valve 139 is in a center or neutral position.

The hydraulic fluid flow control valve 139 is spring biased to the center position and is adapted to be actuated in opposite directions from the center position by means of the electrical solenoids 143 and 144. The solenoids 143 and 144 are preferably operated in a manner described hereinafter. As best seen in FIG. 11, the solenoid operating means includes the microswitches 145 and 146 which are fixed on a suitable support bracket 147 which is secured to the left side of the support member 44 by any suitable means, as by the screws 148. The operating arms of the microswitches 145 and 146 are adapted to be operatively engaged by the horizontal operating pin 149 which extends inwardly through the elongated, longitudinally extended slot 150 and into threaded engagement with the hole 151 in the side of the sleeve 39. The microswitches 145 and 146 and the solenoids 143 and 144 are incorporated in a suitable control circuit (not shown) adapted to be operated selectively from either the control board generally indicated by the numeral 154 in FIG. 1, or a suitable foot pedal (not shown). As shown in FIGS. 1 and 3 the microswitch 145 is operatively connected in said control circuit by the lead wires 152 to the solenoid 144. The microswitch 146 is operatively connected in said control circuit to the solenoid 143 by the lead wires 153. The control circuit does not form a part of the present invention and any suitable control circuit may be employed.

At the start of an operation the valve 139 would be in the center position shown in FIG. 3. The tooth forming apparatus is preferably operated in the following described manner. The workpiece 58 would be loaded into the apparatus and the operator would press a foot pedal or button connected in said control circuit to energize the solenoid 143. When the solenoid 143 is energized, it moves the valve 139 to the left as viewed in FIG. 3 to permit fluid under pressure to pass from the conduit 137 into the conduit 141 and to the rear end of the fluid cylinder 29 so as to move the pressure plate 109 to the left, as viewed in FIG. 3. The forming blades 84 will be moved through a forming operation during the last mentioned movement of the pressure plate 109. The pressure plate 109 moves to the left as viewed in FIG. 3 until the operating pin 149 contacts switch 146 and operates the same, whereby solenoid 143 is de-energized and valve 139 is spring biased to its normal center position. Simultaneously, a time delay relay is energized which, after a few seconds, functions to pass a signal to solenoid 144 to energize the same and move the valve 139 to the right, as viewed in FIG. 3, to reverse the cylinder 29. Fluid under pressure is then directed from the conduit 137 into the conduit 140, and fluid is exhausted from the conduit 141 through the conduit 138. The pressure plate 109 is moved to the right, as viewed in FIG. 3, and the forming blades 84 are retracted until the operating pin 149 operatively engages the microswitch 145 which functions to de-energize or open the circuit to the solenoid 144 and permit the spring biased valve 139 to return to the center position. The cylinder 29 is then in the retracted dotted line positions 108. The finished workpiece is then unloaded from the apparatus and it is in condition to receive a new workpiece. It will be understood that the loading of the workpieces 58 may be carried out manually or by a suitable automatic workpiece loading means.

As shown in FIG. 1, the support arm 12 is provided with a suitable slide 156 on which is operatively mounted a cradle 157 for supporting the outer ends of elongated workpieces 58. It will be understood that a conventional tail stock may be slidably mounted on the slide 156 for supporting workpieces during forming operations, if required because of the particular size or shape of the workpieces.

The various sizes of workpieces which may be operated on is determined by the size of any particular machine and the forming blades 84. In one embodiment workpieces having diameters up to one and a half inches were operated on, and teeth having lengths up to two inches were formed on said workpieces. The operating time for forming teeth on the last mentioned workpieces was about three seconds.

As shown in FIG. 3, the inner end of the workpiece 58 is engaged initially by the center member 57. The center 57 limits the inward movement of the workpiece 58. The use of the center 57 depends upon the particular workpiece being operated on. It will be seen that the center 57 is not necessary in all cases because the workpiece portion 107 may be automatically centered when it is inserted between the inner ends of the particularly illustrated forming blades 84 since they are all arranged in radial positions around the axis of the apparatus to form a centering means for the workpiece when it is loaded into the apparatus.

It will be understood that the forming head body 70 may be removed and replaced with a different forming head having a different number of forming blades 84. The retractor ring 112 is made with a certain number of tangs 116 to coact with an equal number of forming blades 84 on the particular forming head body 70 employed.

In use, the forming blades 84 are retracted to their respective dotted line positions 108 and the workpiece 58 is then inserted into the tooth forming apparatus with the inner end 107 inserted between the outer formed ends 97 of the forming blades. In the illustrative embodiment the workpiece portion 107 engages the center 57 and is disposed in the dotted line position indicated by the numeral 162 in FIG. 13. The numeral 163 indicates the retracted position of the pressure plate 109.

As best seen in FIG. 9 the shaped front end 97 of each of the illustrative forming blades 84 is provided with a front edge 161 which is disposed perpendicular to the longitudinal axis 98 of each blade. Each axis 98 lies on a radius line extended perpendicular to the axis 99 of the respective pivot pin 88. The leading end 158 of each forming edge 161 is theoretically disposed on the blade longitudinal axis line 98. The leading end 158 of each blade is slightly rounded as a practical matter, as shown in FIGS. 9 and 13. The forming edge 161 of each blade 84 is disposed on a tangent line 160 which is tangent to the arc through which the leading end 158 of the forming edge 161 moves when the respective forming blade 84 moves from the retracted dotted line position 108 to the forward solid line position shown in FIGS. 3 and 13.

It will be seen in FIG. 13 that when the forming blades 84 are in the retracted positions 108, that the leading ends 158 of the shaped front end blade portions 97 are in slidable engagement with the cylindrical or conical surface of the workpiece portion 107 and the trailing ends 159 are clear of the workpiece. The fluid cylinder 29 is then actuated to the left, as shown in FIG. 3, as previously described, and the pressure plate 109 moves from the dotted line position 163 to the left, to the solid line position, and pivots the set of forming blades 84 in a simultaneous movement to their respective solid line positions. It will be seen that as the forming blades 84 are rotated from their dotted line positions 108 to their solid line positions, that the leading ends 158 of the shaped ends 97 are moved radially inward into the workpiece portion 107 to displace the workpiece material and form the root 164 and one side of each of two adjacent teeth. The forming edge 161 is progressively moved into the workpiece as the pivoting action of the forming blades progresses from the starting position to the finished position. As the blades 84 pivot during a tooth forming operation, the workpiece 58 moves axially to the left with the forming blades 84. The workpiece 58 continues to move with the forming blades 84 until the forming blades bottom out and the forming operation is complete. It will be seen that the forming action is carried on in a progressive manner until the leading ends 158 of the forming blades 84 are moved to the solid line position shown in FIGS. 3 and 13 and the longitudinal axis 98 of each forming blade is in a position perpendicular to the longitudinal axis of the workpiece 58.

The length of the teeth formed on the workpiece by the illustrative tools 84 depends on the length of the shaped front end 97 and particularly the length of the leading edge 161. In one embodiment two inch long teeth were formed on a workpiece with the pressure plate 109 moving through an axial stroke of one inch. The apparatus of the present invention is adapted to form a plurality of external, elongated spline or gear type teeth as illustrated in FIGS. 12 and 14. It will be seen that the root 164 of the teeth formed on the workpiece is a straight, axially disposed type root. With the particular tool illustrated, the side faces of the teeth formed by the tool are shaped with a concave surface, as shown in FIG. 12, and the outer periphery of each of the teeth extends axially of the workpiece. Experience has shown that the apparatus of the present invention is an economical, fast and efficient means for forming teeth in a non-generating manner on an elongated workpiece.

FIGS. 15 and 16 illustrate a second type of tool which is adapted to form barrel type gear teeth, as illustrated in FIG. 17. The parts of the forming blade illustrated in FIGS. 15 and 16 which are similar to the parts of the forming blade shown in FIGS. 3, 9, 10 and 13, are marked with the same reference numerals followed by the small letter "a." As best seen in FIG. 16 the shaped front end portion or crown 97a is provided with the concave shaped side surfaces 170 and 171 for forming the convex surfaces of one side of each of two adjacent barrel type gear teeth. An illustrative barrel gear tooth 172 of the type which may be formed with the forming blade of FIGS. 15 and 16 is shown in FIG. 17 and is provided with the convex side surfaces 173 and 174. As shown in FIG. 15, the forming edge 161a of the shaped front end portion 97a is formed perpendicular to a blade longitudinal axis which would extend through the shoulder 101a and the axis of the pivot pin of the blade similar to the axis 98 of FIG. 9.

The forming blade of FIGS. 15 and 16 is adapted to be operated by the apparatus of the present invention in the same manner as described hereinbefore for the tool 84. However, it will be understood that because of the variation in the cross section of each of the shaped front end portions 97a, the workpiece will be retracted in unison with the set of forming blades 84a when they are retracted, to permit the shaped front end portions 97a to be withdrawn from the workpiece without damaging the teeth formed on the workpiece during the forming operation. The initial diameter of a workpiece mounted between the set of forming blades 84a would be made of a size to permit the shaped front end portions 97a of the set of forming blades 84a to clear the outer diameter of the teeth formed on the workpiece to permit unloading of the finished workpiece. It will also be understood that other suitable apparatus for pivoting the forming blades 84a may be provided whereby the blades may be retracted slightly outward in a radial direction after a forming operation and before the blades are pivoted back to the initial position so as to clear the finished workpiece and permit it to be unloaded.

FIGS. 18 and 19 illustrate a third type of tool which is adapted to form bevel type gear teeth on a conical surface. The parts of the forming blade embodiment of FIGS. 18 and 19 which are similar to parts of the first tool are marked with the same reference numerals followed by the small letter "b." FIG. 20 shows a workpiece 58b on which has been formed a bevel gear, generally indicated by the numeral 175, and which comprises a plurality of bevel gear teeth 176 formed by a set of forming blades of the type illustrated in FIGS. 18 and 19.

As shown in FIG. 19, the third forming tool includes a shaped front end portion or crown 97b which is provided with converging side surfaces 177 and 178 for forming one side of each of two adjacent bevel type teeth. As shown in FIG. 18, the edge 161b of the shaped front end portion 97b is formed on a line which is non-perpendicular relative to a forming blade longitudinal axis similar to axis 98 of FIG. 9. The forming blade sides 177 and 178 converge rearwardly. The forming blade of FIGS. 18 and 19 is used in the same manner as the blade of FIGS. 9 and 10. However, a set of forming blades 84b would operate in the same manner during the retracting operation as the embodiment of FIGS. 15 and 16.

It will be understood that the principles of the present invention include a non-generating method for forming external spline or gear type teeth on a workpiece which includes the steps of, disposing a plurality of tooth forming blades having shaped inner ends in spaced apart, radial positions, with the outer ends pivotally mounted in a common plane and in a circular disposition concentric with a first axis; pivoting the shaped inner ends of the forming blades along said first axis to positions spaced apart axially from said plane; inserting a workpiece between the inner shaped ends of said forming blades and in alignment with said first axis; pivoting said forming blades simultaneously toward said plane to progressively move the shaped inner ends of the blades radially inward into the workpiece to displace the workpiece material and form a plurality of teeth on the workpiece; and, retracting the shaped inner ends to said first mentioned positions spaced apart axially from said plane.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a non-generating apparatus for forming external teeth on a workpiece, the combination comprising:
   (a) a support housing;
   (b) a forming head mounted on said housing;
   (c) a plurality of tooth forming blades each pivotally mounted about an axis on said forming head and disposed in a circle in spaced apart radial positions;
   (d) each of said tooth forming blades being provided with an arm extended laterally outward from the blade;
   (e) a lip connected transversely to and extending laterally outward from each of said arms and extended longitudinally of the blade on which it is mounted toward said axis in spaced apart relation to said blade;
   (f) pressure means movably mounted on said support housing for movement in an advancing direction for engaging one side of each of said lips to simultaneously pivot said blades about said axis radially inward into a material displacing tooth forming operation on a workpiece disposed between the blades; and,
   (g) retraction means engageable with another side of each of said lips and movable along said axis in a retracting direction for retracting said blades after a tooth forming operation.

2. The non-generating apparatus as defined in claim 1, wherein:
   (a) said pressure means comprises a plate; and,
   (b) said retraction means comprises a ring attached to said plate and movable therewith.

3. The non-generating apparatus as defined in claim 2, including:
   (a) a power mechanism attached to said plate for operating said pressure means and retraction means.

4. The non-generating apparatus as defined in claim 1, wherein:
   (a) said forming head is provided with a plurality of radially disposed slots on one end thereof; and,
   (b) said plurality of tooth forming blades are movably mounted in said slots.

5. The non-generating apparatus as defined in claim 4, wherein:
   (a) said forming head is provided with a peripheral groove intersecting said radially disposed slots; and,
   (b) each of said tooth forming blades is provided on the outer end thereof with a pivot pin disposed in said peripheral groove.

6. In a non-generating apparatus for forming external teeth on a workpiece, the combination comprising:
   (a) a support housing;
   (b) a power cylinder mounted on said housing and provided with a cylinder rod movable forwardly and backwardly along a horizontal axis;
   (c) a forming head detachably mounted on said housing and having an inner end and an outer end and a longitudinal axis aligned with said horizontal axis;
   (d) said forming head being provided with a plurality of radially disposed slots on the inner end thereof;
   (e) a plurality of tooth forming blades pivotally mounted on said forming head and disposed in said slots in a circle in spaced apart radial positions about said longitudinal axis;
   (f) pressure means connected to said cylinder rod for movement along said horizontal axis in a forward advancing direction for engaging said tooth forming blades to simultaneously pivot said blades radially inward from an inoperative position through a material displacing tooth forming operation on a workpiece aligned with said longitudinal axis between the blades;
   (g) retraction means connected to said cylinder rod for movement along said horizontal axis in a rearward retracting direction for engaging said tooth forming blades to simultaneously pivot said blades radially outward to the inoperative position after the tooth forming operation;
   (h) said forming head is provided with a plurality of longitudinally extended slots disposed in a peripherally spaced apart circular arrangement;
   (i) said forming head is further provided with a peripheral groove on the inner end thereof which intersects said longitudinally extended slots and said radially disposed slots;
   (j) a bearing member is mounted in each of said longitudinally disposed slots; and,
   (k) each of said tooth forming blades is provided on the outer end thereof with a pivot pin disposed in said peripheral groove and journalled on one of said bearing members.

7. The non-generating apparatus as defined in claim 6, wherein:
   (a) each of said tooth forming blades is provided with an arm extended laterally outward from the blades;
   (b) each of said arms is provided with a lip integrally connected to the arm and extended longitudinally of the blade on which it is mounted toward said longitudinal axis in spaced apart relation to the blade;
   (c) said pressure means comprises a plate for engaging one side of each of said lips to simultaneously pivot said blades; and,
   (d) said retraction means comprises a ring that is attached to said plate and movable therewith and having a plurality of spaced apart tangs engageable with another side of said lips for retracting said blades.

8. The non-generating apparatus as defined in claim 6, wherein:
   (a) each of said tooth forming blades is provided with a shaped inner end which has an outer edge formed on an axis perpendicular to a longitudinal axis through each of said blades;
   (b) each of said outer edges is provided with a leading end and a trailing end; and,
   (c) the leading ends of said outer edges are disposed in a circular arrangement in said inoperative position for slidable locating reception of the workpiece and for initial displacing engagement with the workpiece.

9. The non-generating apparatus as defined in claim 6, including:
   (a) means for controlling the operation of said power cylinder to control the forward and backward movement of said cylinder rod, and the operation of said pressure means and said retraction means.

10. In a non-generating apparatus for forming external teeth on a workpiece, the combination comprising:
    (a) a support means;
    (b) a plurality of tooth forming blades each pivotally mounted about an axis on said support means and disposed in a circle in spaced apart radial positions;
    (c) each of said blades having the outer ends thereof pivotally mounted in a common plane perpendicular to said axis;
    (d) the inner ends of said blades being shaped into a tooth root forming portion and front and rear shoulder portions for forming teeth in an external surface on a workpiece;
    (e) each of said shaped inner ends of the blades having an outer edge formed on a second axis perpendicular to a longitudinal axis through the blade and through said first mentioned axis and having said front shoulder portion aligned with said longitudinal axis through said blade;

(f) means for pivoting said blades to move the shaped inner ends of the blades radially inward from a first position progressively through a material displacing, tooth forming operation on a workpiece disposed between the blades to a second position; and (g) means for retracting the shaped inner ends of the blades from said second position to said first position.

11. In a non-generating apparatus for forming external teeth on a workpiece, the combination comprising:

(a) a support means;

(b) a plurality of tooth forming blades each pivotally mounted about an axis on said support means and disposed in a circle in spaced apart radial positions;

(c) each of said blades having the outer ends thereof pivotally mounted in a common plane perpendicular to said axis;

(d) the inner ends of said blades being shaped into a tooth root forming portion and front and rear shoulder portions for forming teeth in an external surface on a workpiece;

(e) each of said shaped inner ends of the blades having an outer edge disposed transverse to a longitudinal axis through the blade and through said first mentioned axis and having said front shoulder portion aligned with said longitudinal axis through said blade;

(f) means for pivoting said blades to move the shaped inner ends of the blades radially inward from a first position progressively through a material displacing, tooth forming operation on a workpiece disposed between the blades to a second position; and, (g) means for retracting the shaped inner ends of the blades from said second position to said first position.

12. In a non-generating apparatus for forming external teeth on a workpiece, the combination comprising:

(a) a support means;

(b) a plurality of tooth forming blades each pivotally mounted about an axis on said support means and disposed in a circle in spaced apart radial positions;

(c) each of said blades having the outer ends thereof pivotally mounted in a common plane perpendicular to said axis;

(d) the inner ends of said blades being shaped into a tooth root forming portion and front and rear shoulder portions for forming teeth in an external surface on a workpiece;

(e) each of said shaped inner ends of the blades having an outer edge and a front shoulder portion substantially aligned with a longitudinal axis lying in said common plane perpendicular to said axis of each of said blades;

(f) means for pivoting said blades to move the shaped inner ends of the blades radially inward from a first position progressively through a material displacing, tooth forming operation on a workpiece disposed between the blades to a second position wherein;

(g) means for retracting the shaped inner ends of the blades from said second position to said first position;

(h) each of said tooth forming blades being provided with an operator member; and, (i) said means for pivoting said blades to the second position operatively engaging each of said operator members to move the shaped inner ends of the blades between said first and second positions.

13. The non-generating apparatus as defined in claim 12, wherein:

(a) each of said blade operator members includes an arm extending normally outward from the blade; and, (b) a lip connected to said arm and extended normally to said arm and extended longitudinally of the blade toward said axis and adapted to be operatively engaged by said means for pivoting the blades between said first and second positions.

14. The non-generating apparatus as defined in claim 12, wherein:

(a) each of the shaped inner and outer edges is provided with a leading end and a trailing end; and, (b) the leading ends of said edges are disposed in a circular arrangement for slidable locating reception of the workpiece and for initial displacing engagement with the workpiece, and said leading ends of said edges positioned on or adjacent to but not beyond the longitudinal axis extending through said pivotally mounted axis of each of said tooth forming blades.

15. A non-generating tooth forming tool comprising:

(a) an elongated body having a longitudinal axis;

(b) said body being provided with pivot pin means on one end thereof adapted for pivoting said body about a first axis;

(c) the other end of said body being provided with a tooth forming means having the outer edge thereof disposed on a second axis perpendicular to said first axis for pivotal engagement with the surface of a workpiece for displacing the material of the workpiece in a non-generating tooth forming operation when said body is pivoted about said first axis; and (d) said tooth forming means having front and rear shoulder portions, said front shoulder portion aligned on said longitudinal axis of said body.

16. A non-generating tooth forming tool comprising:

(a) an elongated body having a longitudinal axis;

(b) said body being provided with pivot pin means on one end thereof for pivoting said body about a first axis;

(c) the other end of said body being provided with a tooth forming means provided with a varying cross sectional shape and having the outer edge thereof disposed on a second axis transverse to said first axis for pivotal engagement with the surface of a workpiece for displacing the material of the workpiece in a non-generating tooth forming operation when said body is pivoted about said first axis; and (d) said tooth forming means having front and rear shoulder portions, said front shoulder portion aligned on said longitudinal axis of said body.

17. A non-generating tooth forming tool comprising:

(a) an elongated body having a longitudinal axis;

(b) said body being provided with pivot pin means on one end thereof for pivoting said body about a first axis;

(c) the other end of said body being provided with a tooth forming means having a tooth root forming edge disposed on a second axis perpendicular to said longitudinal axis and front and rear shoulder portions, said front shoulder portion aligned on said longitudinal axis for pivotal engagement with the surface of a workpiece for displacing the material of the workpiece in a non-generating tooth forming operation when said body is pivoted about said first axis; and (d) said tooth root forming edge having a leading end and a trailing end.

18. The non-generating tooth forming tool as defined in claim 17, wherein:

(a) said tooth root forming edge terminates in a straight line disposed on a plane aligned with said longitudinal axis; and (b) said second axis is perpendicular to said first axis and perpendicular to said longitudinal axis of said body.

19. The non-generating tooth forming tool as defined in claim 17, wherein:

(a) said tooth root forming edge is disposed on a plane aligned with said longitudinal axis;

(b) said second axis is transverse to said first axis of said pivot pin means and said longitudinal axis of said body; and (c) said tooth forming edge is provided with a varying cross sectional shape.

20. The non-generating tooth forming tool as defined in claim 17, wherein:

(a) said tooth root forming edge is crowned.

21. The non-generating tooth forming tool as defined in claim 17, wherein:

(a) said means for pivoting the body includes an arm extended laterally outward from said body; and (b) a lip connected to said arm and extended longitudinally of said body toward the pivot means, and having an outer surface adapted to be engaged by a pressure means for advancing the tool during a tool forming operation, and an inner surface adapted to be engaged by means for retracting the tool after a tooth forming operation.

22. A non-generating tooth forming tool comprising:

(a) an elongated body;

(b) said body being provided with a pivot pin on one end thereof for pivoting said body about a first axis;

(c) the other end of said body being provided with a shaped tooth forming means including a tooth root forming edge;

(d) said tooth root forming edge having a leading end and a trailing end;

(e) said leading end being disposed on a second axis extended longitudinally through said body and perpendicuar to and through said first axis; and (f) said tooth root forming edge being angularly disposed relative to said second axis.

23. In a non-generating tooth forming apparatus, in combination, comprising a tooth forming tool having:

(a) an elongated body;

(b) said body being provided with a pivot pin on one end thereof for pivoting the body about a first axis;

(c) the other end of said body being provided with a shaped tooth forming means including a tooth root forming edge;

(d) said tooth root forming edge having a leading end and a trailing end;

(e) said leading end being disposed on a second axis extended longitudinally through said body and perpendicular to and through said first axis;

(f) said tooth root forming edge being angularly disposed relative to said second axis; and (g) means on said body for pivoting the body about said first axis to move the tooth forming means through a tooth forming operation.

References Cited
UNITED STATES PATENTS

| | | | |
|---|---|---|---|
| 874,448 | 12/1907 | Smith | 72—402 |
| 1,625,340 | 4/1927 | Thomas | 72—399 |
| 2,291,803 | 8/1942 | Grotnes | 72—402 |
| 2,295,033 | 9/1942 | Fagan | 72—402 |
| 3,147,539 | 9/1964 | Paille | 72—396 |

CHARLES W. LANHAM, *Primary Examiner.*

G. P. CROSBY, *Assistant Examiner.*